United States Patent
Bisaiji

(10) Patent No.: US 8,555,621 B2
(45) Date of Patent: Oct. 15, 2013

(54) EXHAUST GAS PURIFICATION APPARATUS FOR INTERNAL COMBUSTION ENGINE

(75) Inventor: Yuki Bisaiji, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 638 days.

(21) Appl. No.: 12/674,586

(22) PCT Filed: Sep. 1, 2009

(86) PCT No.: PCT/JP2009/065550
§ 371 (c)(1),
(2), (4) Date: Mar. 3, 2010

(87) PCT Pub. No.: WO2011/027469
PCT Pub. Date: Mar. 10, 2011

(65) Prior Publication Data
US 2011/0308235 A1    Dec. 22, 2011

(51) Int. Cl.
*F01N 3/00* (2006.01)

(52) U.S. Cl.
USPC .................... 60/297; 60/285; 60/286; 60/301

(58) Field of Classification Search
USPC .................... 60/285, 286, 297, 301
See application file for complete search history.

(56) References Cited

U.S. PATENT DOCUMENTS

| | | | |
|---|---|---|---|
| 6,701,707 B1* | 3/2004 | Upadhyay et al. | 60/277 |
| 7,134,273 B2* | 11/2006 | Mazur et al. | 60/286 |
| 8,034,291 B2* | 10/2011 | Qi et al. | 422/62 |
| 8,181,450 B2* | 5/2012 | Garimella et al. | 60/295 |
| 8,209,966 B2* | 7/2012 | Sakata et al. | 60/295 |
| 2004/0040289 A1 | 3/2004 | Mazur et al. | |

FOREIGN PATENT DOCUMENTS

| | | |
|---|---|---|
| JP | A-2002-155784 | 5/2002 |
| JP | A-2004-169607 | 6/2004 |
| JP | A-2004-270469 | 9/2004 |
| JP | A-2004-293338 | 10/2004 |
| JP | A-2005-002851 | 1/2005 |
| JP | A-2005-133609 | 5/2005 |
| JP | A-2005-140002 | 6/2005 |
| JP | A-2006-029331 | 2/2006 |
| JP | A-2007-100508 | 4/2007 |

OTHER PUBLICATIONS

International Search Report issued in corresponding International Patent Application No. PCT/JP2009/065550 dated Nov. 10, 2009.

* cited by examiner

*Primary Examiner* — Binh Q Tran
(74) *Attorney, Agent, or Firm* — Oliff & Berridge, PLC

(57) ABSTRACT

A NOx storing and reducing catalyst is disposed in an engine exhaust gas passage in which the catalyst stores NOx contained in the inflow exhaust gas when an air-fuel ratio of inflow exhaust gas is lean and releases and reduces the stored NOx when the air-fuel ratio of the inflow exhaust gas is rich. A stored NOx amount of the NOx storing and reducing catalyst is calculated and an exhaust gas purification operation is controlled based on the stored NOx amount. When the air-fuel ratio of inflow exhaust gas is lean, a ratio of NOx components in the inflow exhaust gas is calculated. An increment of the stored NOx amount per unit time is calculated based on the ratio of NOx components.

8 Claims, 8 Drawing Sheets

(A)

(B)

(C)

(A)

(B)

(C)

(A)

(B)

EXHAUST GAS PURIFICATION APPARATUS FOR INTERNAL COMBUSTION ENGINE

TECHNICAL FIELD

The present invention relates to an exhaust gas purification apparatus for an internal combustion engine.

BACKGROUND ART

Known in the art is an internal combustion engine having arranged in an engine exhaust passage an NOx storing and reducing catalyst which stores NOx contained in exhaust gas when the air-fuel ratio of the inflow exhaust gas is lean and releases the stored NOx when the air-fuel ratio of the inflow exhaust gas becomes rich. In this internal combustion engine, the NOx produced when burning fuel under a lean air-fuel ratio is stored in the NOx storing and reducing catalyst. On the other hand, an amount of the stored NOx is calculated, and when the stored NOx amount exceeds a threshold, a rich process, in which the air-fuel ratio of the exhaust gas is temporarily made rich, is performed and thereby the NOx is released from the NOx storing and reducing catalyst and reduced.

In this case, if the calculated amount of the stored NOx is not accurate, the rich process may be performed even though the actual NOx amount is small, and as a result, fuel consumption may increase. If the rich process cannot be performed even though the actual NOx amount is large, and as a result, NOx may pass through the NOx storing and reducing catalyst. Therefore, the stored NOx amount has to be accurately calculated.

From this point of view, there is known an internal combustion engine in which the stored NOx amount is estimated using a polynomial that reflects NOx storing characteristics of the NOx storing and reducing catalyst (See PTL 1.)

CITATION LIST

Patent Literature
PTL1: Japanese Unexamined Patent Publication No. 2004-293338

SUMMARY OF INVENTION

Technical Problem

NOx stored in the NOx storing and reducing catalyst is comprised of components such as nitrogen monoxide NO and nitrogen dioxide $NO_2$. However, for example, the mechanism by which NO is stored in the NOx storing and reducing catalyst is not exactly the same as that by which $NO_2$ is stored in the NOx storing and reducing catalyst. Therefore, in order to accurately calculate the stored NOx amount, the composition of NOx in the inflow exhaust gas has to be taken into account. In the internal combustion engine mentioned above, this fact is not taken into account.

Solution to Problem

According to the present invention, there is provided an exhaust gas purification device for an internal combustion engine having an exhaust gas passage, comprising: a NOx storing and reducing catalyst that is disposed in the exhaust gas passage and that stores NOx contained in the inflow exhaust gas when an air-fuel ratio of inflow exhaust gas is lean and releases and reduces the stored NOx when the air-fuel ratio of the inflow exhaust gas becomes rich; a stored NOx amount calculation unit for calculating an stored NOx amount of the NOx storing and reducing catalyst; and a control unit for controlling an exhaust gas purification operation based on the calculated stored NOx amount, wherein, when the air-fuel ratio of the inflow exhaust gas is lean, a ratio of NOx components in the inflow exhaust gas is calculated, and an increment of the stored NOx amount per unit time is calculated based on the calculated ratio of NOx components.

Advantageous Effects of Invention

The amount of the stored NOx of the NOx storing and reducing catalyst can be calculated more accurately.

DESCRIPTION OF EMBODIMENTS

Figure 1:
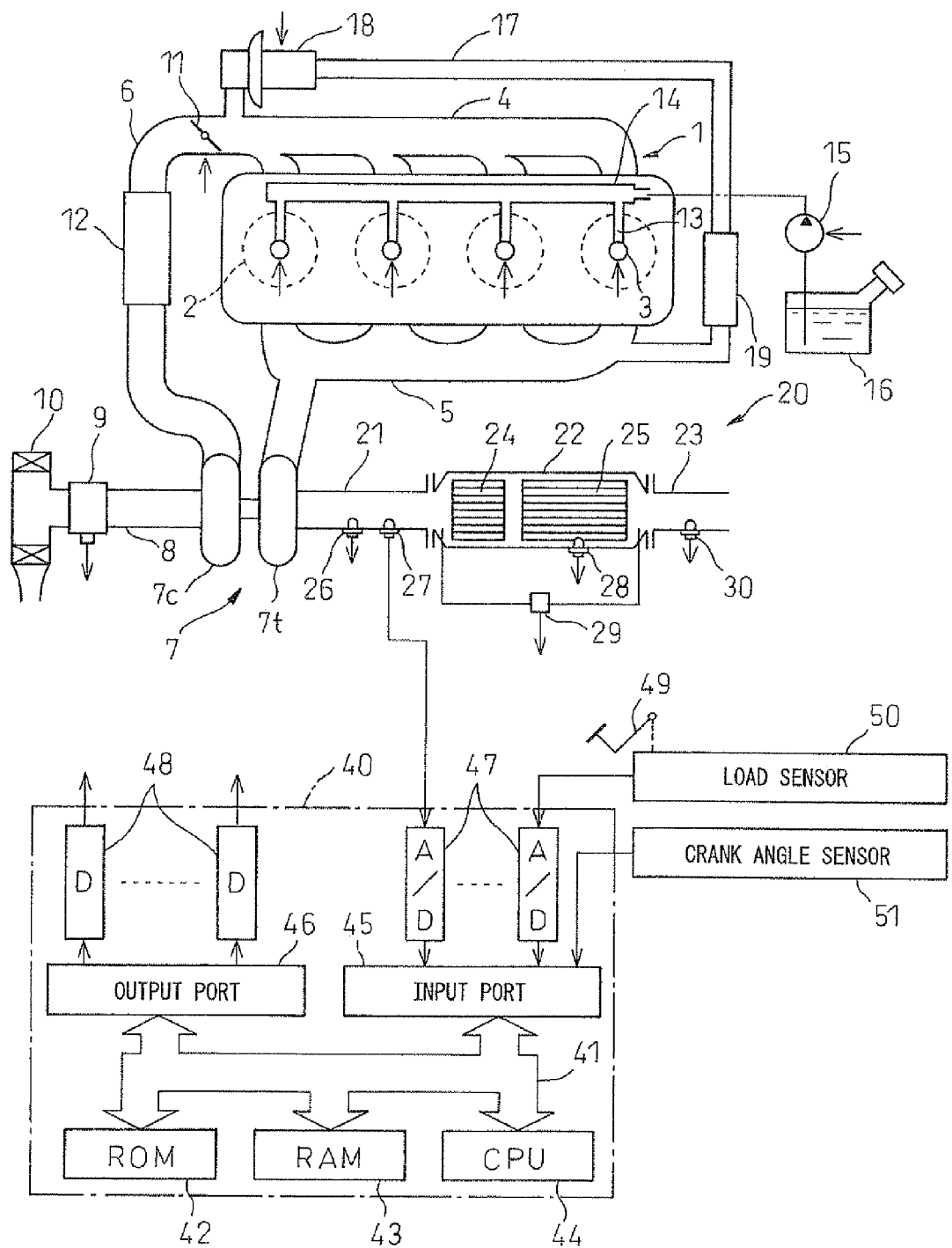
FIG. 1 is an overall view of an internal combustion engine.

FIG. 1 shows the case of application of the present invention to a compression ignition type internal combustion engine. Alternatively, the present invention can also be applied to a spark ignition type engine.

Referring to FIG. 1, the numeral 1 indicates an engine body, 2 a combustion chamber of each cylinder, 3 an electronic control type fuel injector for injecting fuel into each combustion chamber 2, 4 an intake manifold, and 5 an exhaust manifold. The intake manifold 4 is connected through an intake duct 6 to an outlet of a compressor 7c of an exhaust turbocharger 7. An inlet of the compressor 7c is connected through an air introduction pipe 8 to an air flow meter 9 and an air cleaner 9, in turn. Inside the intake duct 6, an electrical control type throttle valve 11 is arranged. Further, around the intake duct 6, a cooling device 12 is arranged to cool the intake air flowing inside the intake duct 6. On the other hand, the exhaust manifold 5 is connected to an inlet of an exhaust turbine 7t of the exhaust turbocharger 7. The outlet of the exhaust turbine 7t is connected to an exhaust post-treatment device 20.

Each fuel injector 3 is connected through a fuel feed tube 13 to a common rail 14. This common rail 14 is connected through an electronic control type variable discharge fuel pump 15 to a fuel tank 16. The fuel in the fuel tank 16 is fed by the fuel pump 15 inside the common rail 14. The fuel fed into the common rail 14 is fed through each fuel feed tube 13 to each fuel injector 3. In this connection, a fuel pressure sensor (not shown) is attached to the common rail 14 to detect the fuel pressure in the common rail 14. The amount of fuel pumped by the fuel pump 15 is controlled on the basis of the signal from the fuel pressure sensor so that the fuel pressure in the common rail 14 becomes a target fuel pressure.

The exhaust manifold 5 and the intake manifold 4 are connected with each other through an exhaust gas recirculation (hereinafter referred to as an "EGR") passage 17. Inside the EGR passage 17, an electrical control type EGR control valve 18 is arranged. Further, around the EGR passage 17, a cooling device 19 is arranged for cooling the EGR gas flowing through the EGR passage 17.

The exhaust post-treatment device 20 comprises an exhaust pipe 21 connected to an outlet of the exhaust turbine 7t. The exhaust pipe 21 is connected to a casing 22, and the casing 22 is connected to an exhaust pipe 23. A pre-stage catalyst 24 having a relatively small capacity is housed in the upstream side of the casing 22, and a NOx storing and reducing catalyst 25 having a relatively large capacity is housed in the downstream side of the casing 22. The pre-stage catalyst 24 is comprised of a catalyst having oxidation functions, such as a three way catalyst. In this connection, the three way catalyst 24 and the NOx storing and reducing catalyst 25 may be housed in different casings, respectively. In addition, the three way catalyst 24 may be omitted.

Attached to the exhaust pipe 21 are a temperature sensor 26 for detecting the temperature of the exhaust gas flowing into the NOx storing and reducing catalyst 25, and an air-fuel ratio sensor 27 for detecting an air-fuel ratio of the exhaust gas flowing into the casing 22. In addition, attached to the casing 22 are a temperature sensor 28 for detecting a catalyst temperature, which is a temperature of the NOx storing and reducing catalyst 25, and a pressure difference sensor 29 for detecting the pressure difference between pressures at the upstream and downstream of the casing 22. Further attached to the exhaust pipe 23 is an air-fuel ratio sensor 30 for detecting the air-fuel ratio of the exhaust gas discharged from the casing 22. Note that the temperature of the exhaust gas detected by the temperature sensor 26 expresses a temperature of the three way catalyst 24.

The electronic control unit 40 is comprised of a digital computer which is provided with components connected to each other by a bidirectional bus 41 such as a ROM (read only memory) 42, RAM (random access memory) 43, CPU (microprocessor) 44, input port 45, and output port 46. The output voltage of the air flow meter 8, the temperature sensors 26, 28, the air-fuel ratio sensors 27, 30, and the pressure difference sensor 29 are input through corresponding AD converters 47 to the input port 45. In addition, an accelerator pedal 49 has a load sensor 50 connected to it for generating an output voltage proportional to the amount of depression of the accelerator pedal 49. The output voltage of the load sensor 50 is input through a corresponding AD converter 47 to the input port 45. Further, the input port 45 has a crank angle sensor 51 connected to it for generating an output pulse each time the crankshaft rotates by for example 30°. The CPU 44 calculates the engine speed on the basis of the output pulse from the crank angle sensor 51. On the other hand, the output port 46 is connected through a corresponding drive circuit 48 to the fuel injectors 3, a drive for the throttle valve 11, the fuel pump 15, and the EGR control valve 18.

Figure 2:
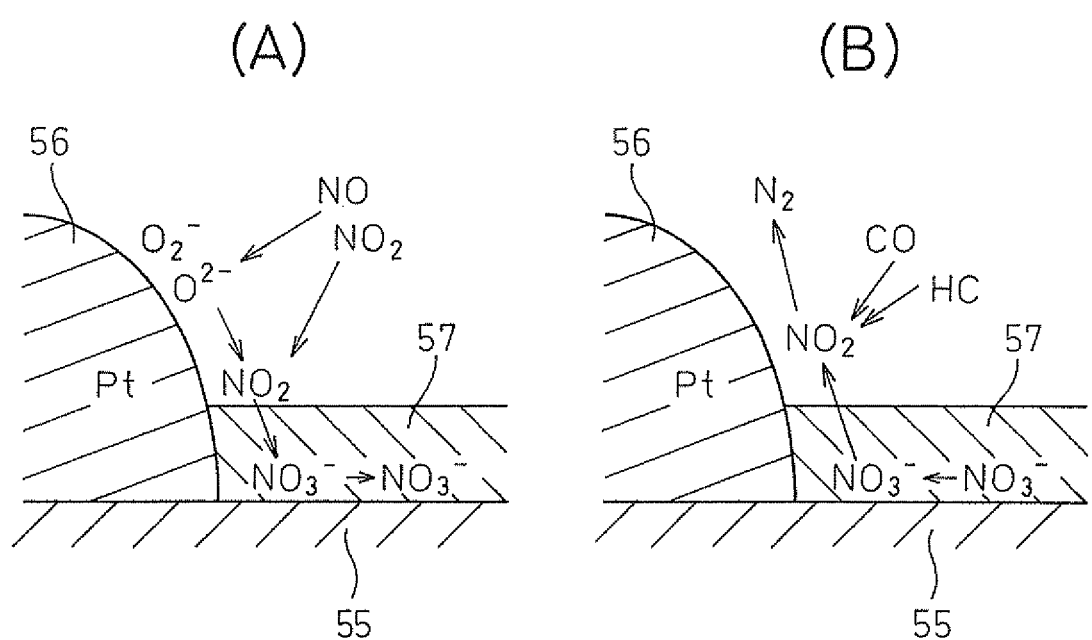
FIGS. 2(A) and 2(B) are cross-sectional views of a surface part of a catalyst carrier of a NOx storing and reducing catalyst.

The NOx storing and reducing catalyst 25 forms a honeycomb structure and is provided with a plurality of exhaust gas flow passages separated from each other by thin partition walls. On the two side surfaces of each partition wall, for example, a catalyst carrier comprised of alumina is carried. FIGS. 2(A) and 2(B) schematically show cross-sections of the surface parts of this catalyst carrier 55. As shown in FIGS. 2(A) and 2(B), the catalyst carrier 55 has a precious metal catalyst 56 carried dispersed on its surface. Further, the catalyst carrier 55 has a layer of an NOx absorbent 57 formed on its surface.

In the embodiment according to the present invention, as the precious metal catalyst 56, one selected from platinum Pt, palladium Pd, Osmium Os, Gold Au, Rhodium Rh, Iridium Ir and Ruthenium Ru, is used. As the ingredient forming the NOx absorbent 57, for example, at least one ingredient selected from potassium K, sodium Na, cesium Cs, or another such alkali metal, barium Ba, calcium Ca, or another such alkali earth, and lanthanum La, yttrium Y, or another such rare earth is used.

If the ratio of the air and fuel supplied inside the engine intake passage, combustion chambers 2, and exhaust passage upstream of a certain position is referred to as the air-fuel ratio of the exhaust gas at the certain position, the NOx absorbent 57 performs an NOx absorption and release action, in which the NOx absorbent 57 absorbs the NOx when the air-fuel ratio of the inflow exhaust gas is lean and releases the absorbed NOx when the oxygen concentration in the inflow exhaust gas falls.

That is, explaining the case of using platinum Pt as the precious metal catalyst 56 and barium Ba as the ingredient forming the NOx absorbent 57 as an example, when the air-fuel ratio of the inflow exhaust gas is lean, that is, when the oxygen concentration in the inflow exhaust gas is high, the NO contained in the exhaust gas, as shown in FIG. 2(A), is oxidized on the platinum Pt 56 and becomes $NO_2$, next this is absorbed in the NOx absorbent 57 and, while bonding with the barium oxide BaO, diffuses in the form of nitric acid ions $NO_3^-$ inside the NOx absorbent 57. In this way, the NOx is absorbed inside the NOx absorbent 57. So long as the oxygen concentration in the inflow exhaust gas is high, $NO_2$ is produced on the surface of the platinum Pt 56. So long as the NOx absorption ability of the NOx absorbent 57 is not saturated, the $NO_2$ is absorbed in the NOx absorbent 57 and nitric acid ions $NO_3^-$ are produced. In contrast, $NO_2$ included in NOx in the exhaust gas is absorbed in the NOx absorbent 57 without the oxidation process.

As opposed to this, if the air-fuel ratio of the inflow exhaust gas is made rich, the oxygen concentration in the inflow exhaust gas falls, so the reaction proceeds in the opposite direction ($NO_3^- ->NO_2$) and therefore, as shown in FIG. 2(B), the nitric acid ions $NO_3^-$ in the NOx absorbent 57 are released in the form of $NO_2$ from the NOx absorbent 57. Next, the released NOx is reduced by the unburned HC and CO contained in the inflow exhaust gas.

The three way catalyst 24 also forms a honeycomb structure and is provided with a plurality of exhaust gas flow passages separated from each other by thin partition walls. On the two side surfaces of each partition wall, for example, a catalyst carrier comprised of alumina is carried. The catalyst carrier carries precious metal such as platinum Pt, palladium Pd, and Rhodium Rh, and an oxygen storage material such as cerium oxide.

The three way catalyst 24 purifies HC, CO and NOx contained in the inflow exhaust gas simultaneously, when the air-fuel ratio of the inflow exhaust gas is substantially stoichiometric.

Further, three-way catalyst 24 constitutes an oxygen storage catalyst that stores oxygen contained in the exhaust gas when the air-fuel ratio of the inflow exhaust gas is lean and releases the stored oxygen when the air-fuel ratio of the inflow exhaust gas becomes rich. That is, in the example in which the oxygen storage material is comprised of cerium Ce, when the air-fuel ratio of the inflow exhaust gas is lean, an oxygen molecule $O_2$ contained in the exhaust gas is captured in the form of $CeO_2$ ($Ce_2O_3$->$2CeO_2$). In contrast to this, when the air-fuel ratio of the inflow exhaust gas becomes rich, the reaction advances in the reverse direction ($2CeO_2$->$Ce_2O_3$) so that the oxygen molecule $O_2$ is released.

In the embodiment according to the present invention, the combustion is typically performed in the lean air-fuel ratio. In this case, because the air-fuel ratio of the exhaust gas flowing into the NOx storing and reducing catalyst 25 is lean, NOx in the inflow exhaust gas is stored in the NOx storing and reducing catalyst 25. However, as the engine continuously operates, the stored NOx amount of the NOx storing and reducing catalyst 25 increases, and eventually, it is impossible for the NOx storing and reducing catalyst 25 to store NOx.

Therefore, in the embodiment according to the present invention, before the NOx storing and reducing catalyst 25 is saturated by NOx, the air-fuel ratio of the inflow exhaust gas is temporarily made rich, so that NOx is released from the NOx storing and reducing catalyst 25 and reduced to $N_2$. As a result, the stored NOx amount decreases.

More specifically, a rich process is executed, in which the air-fuel ratio of the inflow exhaust gas is temporarily made rich to release and reduce NOx stored in the NOx storing and reducing catalyst 25. In this case, in order to make the air-fuel ratio of the inflow exhaust gas rich, the combustion is executed temporarily in the rich air-fuel ratio while an amount of intake air is decreased and an amount of EGR gas is increased. As a result, a large amount of carbon monoxide CO is contained in the exhaust gas and acts as a reducing agent. Alternatively, in order to make the air-fuel ratio of the inflow exhaust gas rich, a reducing agent such as fuel (hydrocarbons) may be added in the exhaust gas passage upstream of the NOx storing and reducing catalyst 25. In the rich process, NOx in the NOx storing and reducing catalyst 25 may be released either partially or substantially completely.

A large amount of fuel is required to execute the rich process. Therefore, in order to decrease fuel consumption, during the operation of the engine with the lean air-fuel ratio, whether to start the rich process or not has to be determined appropriately and during the rich process, whether to continue or stop the rich process has to be determined appropriately.

Therefore, in the embodiment according to the present invention, the stored NOx amount NOXst of the NOx storing and reducing catalyst 25 is calculated and, the exhaust gas purification operation is controlled based on the stored NOx amount NOXst.

In the embodiment according to the present invention, the stored NOx amount NOXst is calculated repeatedly according to the following equation E1:

$$NOXst=NOXst+NOXin-NOXrd \quad (E1)$$

where NOXin and NOXrd represent an increment and a decrement of the stored NOx amount NOXst per unit time, respectively.

The decrement NOXrd is assumed to be zero when the air-fuel ratio of the inflow exhaust gas is lean. When the air-fuel ratio of the inflow exhaust gas is rich or stoichiometric, the decrement NOXrd is calculated based on the air-fuel ratio of the inflow exhaust gas, the stored NOx amount NOXst and temperature TN of the NOx storing and reducing catalyst 25, for example.

On the other hand, the increment NOXin is assumed to be zero when the air-fuel ratio of the inflow exhaust gas is rich or stoichiometric. When the air-fuel ratio of the inflow exhaust gas is lean, the increment NOXin is calculated as follows.

NOx may be comprised of various components such as NO, $NO_2$ and $N_2O$. However, as described above with reference to FIG. 2(A), the mechanism by which NO is stored in the NOx storing and reducing catalyst 25 is not exactly the same as that by which $NO_2$ is stored in the NOx storing and reducing catalyst 25. Namely, roughly speaking, because the oxidation process is not required to store $NO_2$, $NO_2$ is more likely to be stored than NO.

Therefore, in the embodiment according to the present invention, increments for each component of NOx are calculated and these increments are summed up to calculate the increment NOXin of the stored NOx amount. Thus, assuming that NOx in the inflow exhaust gas is comprised of NO and $NO_2$, the increment NOXin is calculated according to the following equation E2:

$$NOXin=QNX \cdot PN1 \cdot VN1+QNX \cdot PN2 \cdot VN2 \quad (E2)$$

where QNX represents an inflow NOx amount, PN1 represents a NO ratio, PN2 represents a $NO_2$ ratio, VN1 represents a NO storing rate, and VN2 represents a $NO_2$ storing rate.

The inflow NOx amount QNX is an amount of NOx that flows into the NOx storing and reducing catalyst 25 per unit time. It is calculated based on engine operation conditions such as engine load and engine speed. Alternatively, a NOx sensor for detecting the inflow NOx amount may be disposed in the exhaust gas passage upstream of the NOx storing and reducing catalyst 25 so as to determine the inflow NOx amount QNX based on an output of the NOx sensor.

Figure 3:
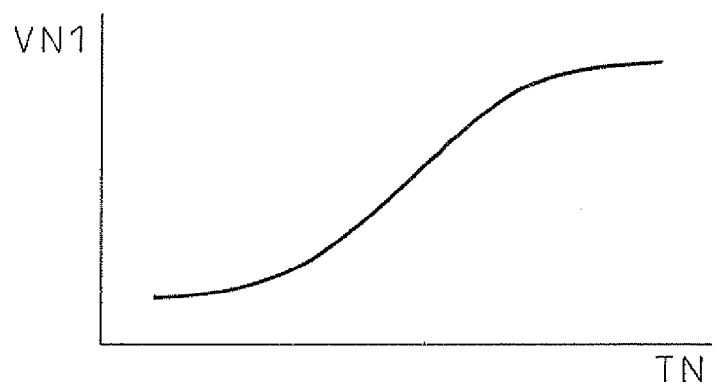
FIGS. 3(A), 3(B) and 3(C) are diagrams illustrating a mapping of a NO storing rate NV1.
Figure 3:
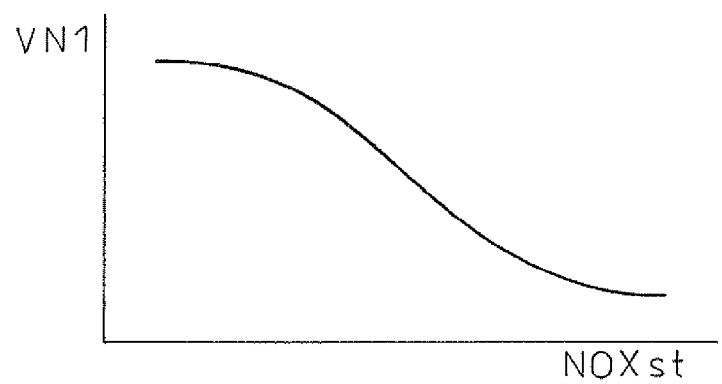
Figure 3:
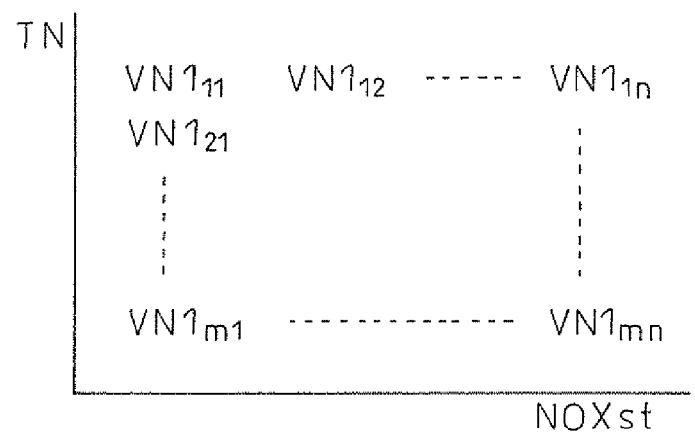

The NO storing rate VN1 is a ratio of the NO amount stored in the NOx storing and reducing catalyst 25 to the NO amount in the inflow exhaust gas. This NO storing rate VN1 increases as the temperature TN of the NOx storing and reducing catalyst 25 increases as illustrated in FIG. 3(A) and decreases as the stored NOx amount NOXst increases as illustrated in FIG. 3(B). The NO storing rate VN1 is experimentally determined in advance and stored in ROM 42 in advance in the form of a mapping as a function of the catalyst temperature TN and the stored NOx amount NOXst, as illustrated in FIG. 3(C).

Figure 4:
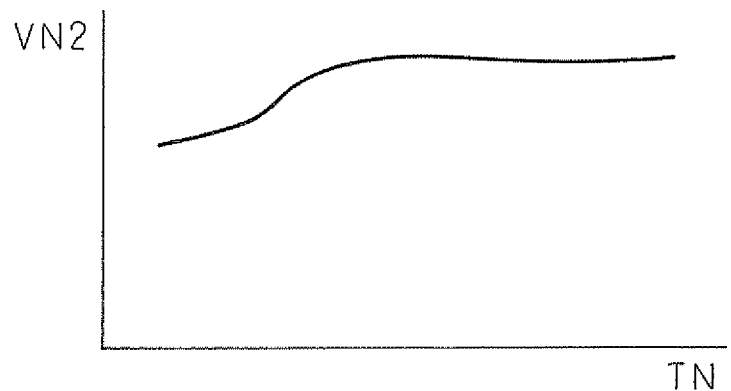
FIGS. 4(A), 4(B) and 4(C) are diagrams illustrating a mapping of a $NO_2$ storing rate NV2.
Figure 4:
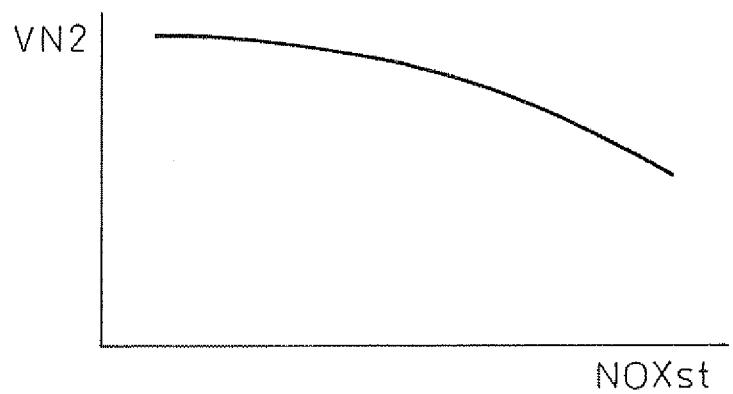
Figure 4:
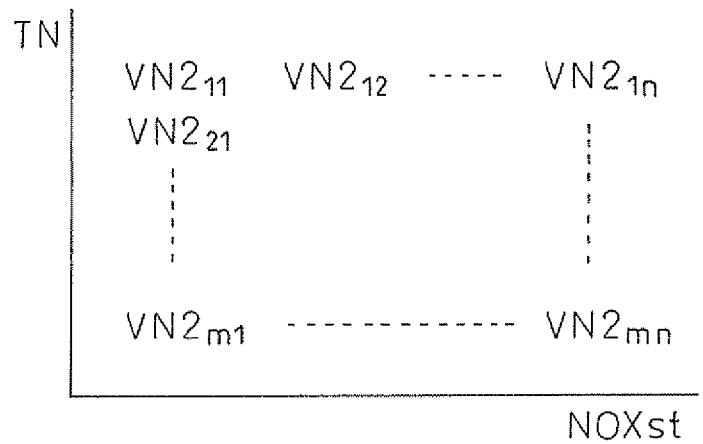

The $NO_2$ storing rate VN2 is a ratio of the $NO_2$ amount stored in the NOx storing and reducing catalyst 25 to the $NO_2$ amount in the inflow exhaust gas. This $NO_2$ storing rate VN2 increases as the temperature TN of the NOx storing and reducing catalyst 25 increases as illustrated in FIG. 4(A) and decreases as the stored NOx amount NOXst increases as illustrated in FIG. 4(B). The $NO_2$ storing rate VN2 is experimentally determined in advance and stored in ROM 42 in advance in the form of a mapping as a function of the catalyst temperature TN and the stored NOx amount NOXst, as illustrated in FIG. 4(C).

The NO ratio PN1 is a ratio of the NO amount to the total NOx amount contained in the exhaust gas flowing into the NOx storing and reducing catalyst 25 (the NO amount/the total NOx amount). On the other hand, the $NO_2$ ratio PN2 is a ratio of the $NO_2$ amount to the total NOx amount contained in the exhaust gas flowing into the NOx storing and reducing catalyst 25 (the $NO_2$ amount/the total NOx amount).

In the embodiment according to the present invention, it is assumed that the NOx components are comprised of NO and $NO_2$, and therefore the $NO_2$ ratio PN2 is calculated according to the following equation E3:

$$PN2=1-PN1 \quad (E3)$$

Figure 5:
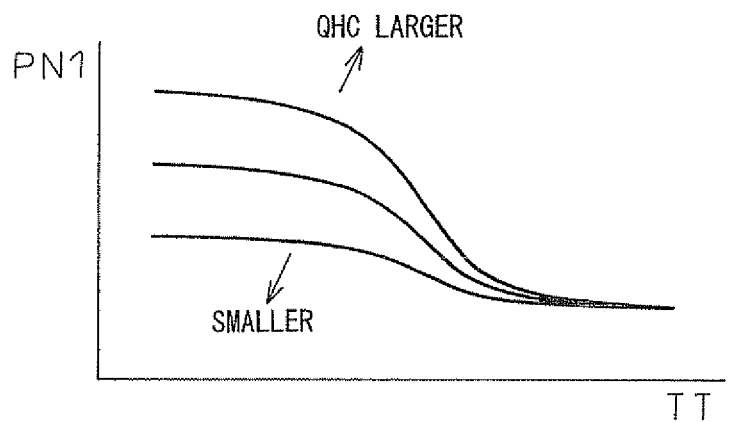
FIGS. 5(A) and 5(B) are diagrams illustrating mappings of a NO ratio PN1.
Figure 5:
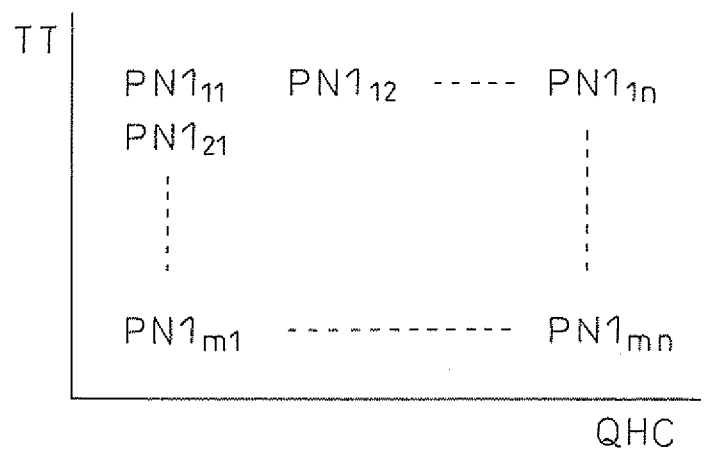

As illustrated in FIG. 5(A), the NO ratio PN1 decreases as the temperature TT of three-way catalyst 24 increases and increases as an inflow HO amount QHC increases, wherein the inflow HC amount QHC is an amount of the hydrocarbons HC flowing into three-way catalyst 24 per unit time. The NO ratio PN1 is experimentally determined in advance and stored in ROM 42 in advance in the form of a mapping as a function of the catalyst temperature TT and the inflow HO amount QHC, as illustrated in FIG. 5(B). Further, the inflow HC amount QHC is stored in ROM 42 in advance as a function of the engine operation conditions, such as the engine load Le and the engine speed Ne.

More specifically, when the temperature TT of three-way catalyst 24 is low, in particular, before the activation, $NO_2$ is reduced to NO by HC in three-way catalyst 24 ($NO_2$->NO) and, as a result, the NO ratio PN1 increases and the $NO_2$ ratio PN2 decreases. In this case, as the inflow HC amount QHC increases, the NO ratio PN1 increases. On the other hand, when the temperature TT of three-way catalyst 24 is high, in particular, after the activation, NO is oxidized to $NO_2$ in three-way catalyst 24 (NO->$NO_2$), and as a result, the NO ratio PN1 decreases and the $NO_2$ ratio PN2 increases.

In the above equation E2, the first term on the right side represents the NO amount stored in the NOx storing and reducing catalyst 25 per unit time or the increment of NO, and the second term on the right side represents the $NO_2$ amount stored in the NOx storing and reducing catalyst 25 per unit time or the increment of $NO_2$.

When the air-fuel ratio of the inflow exhaust gas is lean, the increment NOXin is repeatedly calculated by the above equation E2, and the stored NOx amount NOXst is repeatedly updated every time the increment NOXin is calculated.

As described above, because the composition of NOx is taken into account, the increment NOXin and, thus, the stored NOx amount NOXst can be calculated accurately.

NOx may contain other components such as $N_2O$. Therefore, when a ratio and an storing rate of the components j in NOx are denoted by PNj and VNj, respectively, the increment NOXin is calculated according to the following equation E4:

$$NOXin = QNX \cdot \Sigma(PNj \cdot VNj) \quad (E4)$$

Therefore, generalizing the above discussion, when the air-fuel ratio of the inflow exhaust gas is lean, a ratio of NOx components in the inflow exhaust gas is calculated and the increment NOXin of the stored NOx amount NOXst per unit time is calculated based on the calculated ratio of NOx components.

Next, the control of the rich process in the embodiment according to the present invention will be described.

In the embodiment according to the present invention, when the air-fuel ratio of the inflow exhaust gas is lean, a rich process requirement index IDX is repeatedly calculated. This rich process requirement index IDX indicates a degree of need for the rich process and a higher rich process requirement index IDX indicates a higher need for the rich process ($0 \leq IDX \leq 1$). On this basis, when the rich process requirement index IDX is smaller than a threshold TH, the rich process is not performed and when the rich process requirement index IDX is larger than the threshold TH, the rich process is performed.

This rich process requirement index IDX is calculated according to the following equation E5:

$$IDX = IDXpn \cdot IDXst \cdot IDXrd \quad (E5)$$

where IDXpn, IDXst and IDXrd represent various indexes, respectively.

Figure 6:
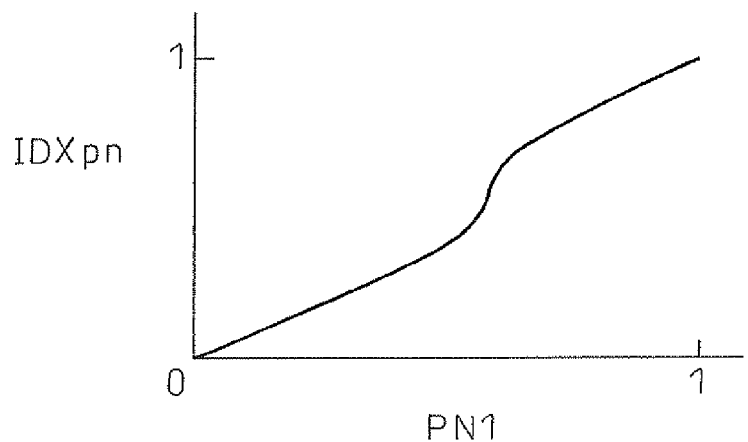
FIG. 6 is a diagram illustrating a mapping of an index IDXpn.

The index IDXpn is determined based on the ratio of NOx components. As illustrated in FIG. 6, the index IDXpn increases as the NO ratio PN1 ($0 \leq IDXpn \leq 1$). Thus, in the example illustrated in FIG. 6, the ratio of NOx components is represented by the NO ratio PN1. However, the index IDXpn may be determined according to the $NO_2$ ratio PN2, for example. The index IDXpn is stored in ROM 42 in advance in the form of a mapping as a function of the NO ratio PN1, as illustrated in FIG. 6.

Thus, as described above, NO is more unlikely to be stored in the NOx storing and reducing catalyst 25 than $NO_2$. Therefore, when the NO ratio PN1 is high and the NO amount is large, it is preferable not to execute the NOx storing operation but to perform the rich process for releasing and reducing NOx. In contrast to this, when the NO ratio PN1 is low and the $NO_2$ amount is large, it is preferable not to execute the rich process but to execute the NOx storing operation.

Figure 7:
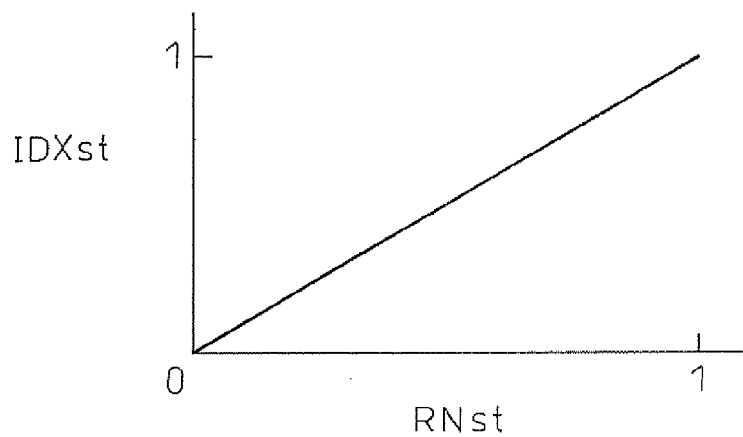
FIG. 7 is a diagram illustrating a mapping of an index IDXst.

The index IDXst is determined based on the stored NOx amount NOXst. When a ratio of the stored NOx amount NOXst to the maximum possible stored NOx amount of the NOx storing and reducing catalyst 25 is referred to as a NOx storing ratio RNst, the index IDXst increases as the NOx storing ratio RNst increases, as illustrated in FIG. 7. Thus, in the example illustrated in FIG. 7, the stored NOx amount NOXst is represented by the NOx storing ratio RNst. The index IDXst may be determined according to the stored NOx amount NOXst, for example. The index IDXst is stored in ROM 42 in advance in the form of a mapping as a function of the NOx storing ratio RNst, as illustrated in FIG. 7.

Thus, when the NOx storing ratio RNst is large, it is preferable to execute the rich process for releasing and reducing NOx. In contrast to this, when the NOx storing ratio RNst is small, it is preferable not to execute the rich process but to perform the NOx storing operation.

Figure 8:
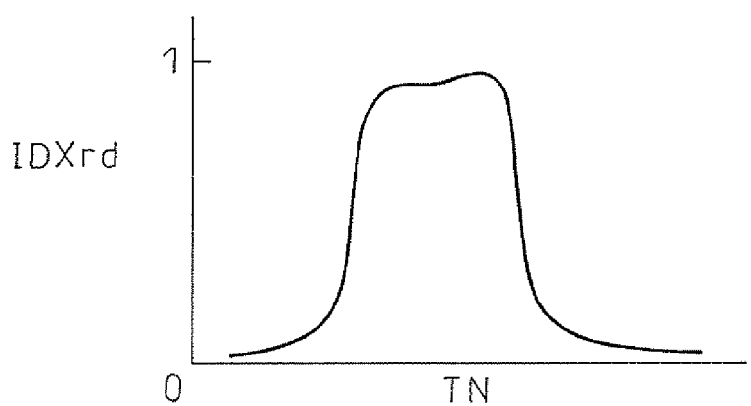
FIG. 8 is a diagram illustrating a mapping of an index IDXrd.

The index IDXrd is determined based on NOx reduction capability of the NOx storing and reducing catalyst 25. As illustrated in FIG. 8, when the temperature TN of the NOx storing and reducing catalyst 25 is low, the index IDXrd increases as the catalyst temperature TN increases but, when the catalyst temperature TN is high, the index IDXrd decreases as the catalyst temperature TN increases. Thus, in the example illustrated in FIG. 8, the NOx reduction capability of the NOx storing and reducing catalyst 25 is represented by the catalyst temperature TN. The index IDXrd may be determined according to the NOx purification rate of the NOx storing and reducing catalyst 25, for example. The index IDXrd is stored in ROM 42 in advance in the form of a mapping as a function of the catalyst temperature TN, as illustrated in FIG. 8.

Thus, when the NOx reduction capability of the NOx storing and reducing catalyst 25 is high, it is preferable to execute the rich process for releasing and reducing NOx. In contrast to this, when the NOx reduction capability is low, it is preferable not to execute the rich process but to perform the NOx storing operation.

When the indexes IDXpn, IDXst and IDXrd are large, the rich process requirement index IDX is also large. When the rich process requirement index IDX is larger than the threshold TH, the rich process is performed. In contrast to this, when the indexes IDXpn, IDXst and IDXrd are small, the rich process requirement index IDX is also small. When the rich process requirement index IDX is smaller than the threshold TN, the rich process is not executed.

In this setting, for example, even if the stored NOx amount NOXst is large, the rich process is not started when the reducing agent cannot be effectively utilized. Therefore, NOx can be reliably reduced while decreasing consumption of the reducing agent or the fuel.

Therefore, generalizing the above discussion, when the air-fuel ratio of the inflow exhaust gas is lean, whether to execute the rich process or not is determined based on the ratio of NOx components. Or, in another aspect, whether to execute the rich process or not is determined based on the ratio of NOx components, the stored NOx amount and the reduction capability of the NOx storing and reducing catalyst 25.

In the embodiment according to the present invention, a temperature rising process is executed, in which the temperature of the NOx storing and reducing catalyst 25 is increased while the air-fuel ratio of the inflow exhaust gas is maintained lean. This is because when the temperature TN of the NOx storing and reducing catalyst 25 is low, the NOx storing rate VN1, VN2 is low and, therefore, NOx may not be reliably stored in the NOx storing and reducing catalyst 25, as can be seen in FIGS. 3(A) and 4(A).

This temperature rising process is executed when the temperature TN of the NOx storing and reducing catalyst 25 is lower than a predetermined temperature, for example, the activation temperature, so that the temperature TN of the NOx storing and reducing catalyst 25 is maintained higher than the predetermined temperature. When the catalyst temperature TN is higher than the activation temperature, it is not necessary to execute the temperature rising process.

The temperature rising process is executed as follows, for example. Thus, for example, while the air-fuel ratio of the inflow exhaust gas is maintained lean, additional fuel is injected from fuel injection valve 3 in the expansion or exhaust stroke and the additional fuel is combusted in three-way catalyst 24 or the NOx storing and reducing catalyst 25. Alternatively, while the air-fuel ratio of the inflow exhaust gas is kept lean, the fuel injection timing is retarded or the exhaust valve opening timing is advanced to increase the temperature of the inflow exhaust gas.

In this case, during the rich process, the air-fuel ratio of the inflow exhaust gas is rich, and therefore the temperature rising process cannot be executed. In contrast to this, the rich process cannot be executed during the temperature rising process.

Because of this, it can be said that when the rich process requirement index IDX is larger than the threshold TH, the rich process is selected, and when the rich process requirement index IDX is smaller than the threshold TH, the temperature rising process is selected.

Therefore, in general when the air-fuel ratio of the inflow exhaust gas is lean, whether to execute the rich process or the temperature rising process is selected based on the ratio of NOx components or, in another aspect, whether to execute the rich process or the temperature rising process is selected based on the ratio of NOx components, the stored NOx amount and the reduction capability of the NOx storing and reducing catalyst 25.

Even if the air-fuel ratio AFI of the exhaust gas flowing into casing 22 is rich, the exhaust gas flowing into the NOx storing and reducing catalyst 25 may not be rich due to the oxygen storage capability of three-way catalyst 24. On the other hand, it is confirmed that, while the air-fuel ratio of the exhaust gas flowing into the NOx storing and reducing catalyst 25 is rich and the NOx is being released and reduced, the air-fuel ratio of the exhaust gas flowing out of the NOx storing and reducing catalyst 25 is kept stoichiometric or rich.

Therefore, in the embodiment of the present invention, when the air-fuel ratio AFO of the outflow exhaust gas detected by air-fuel ratio sensor 30 is lean, the air-fuel ratio of the exhaust gas flowing into the NOx storing and reducing catalyst 25 is determined to be lean and, when the air-fuel ratio AFO of the outflow exhaust gas is stoichiometric or rich, the air-fuel ratio of the exhaust gas flowing into the NOx storing and reducing catalyst 25 is determined to be rich.

Figure 9:
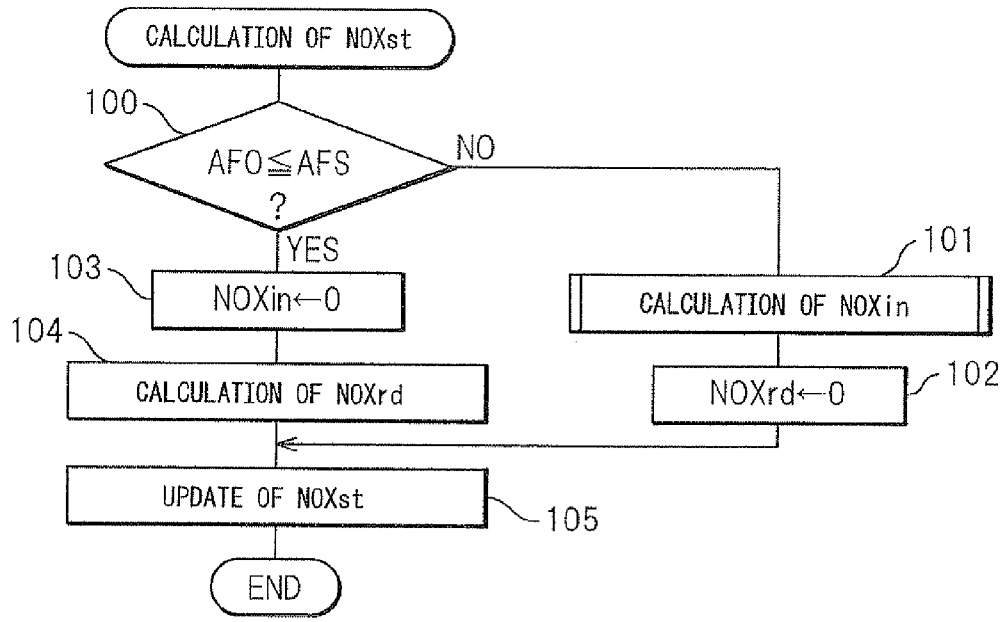
FIG. 9 is a flow chart illustrating a calculation routine for a stored NOx amount NOXst.

FIG. 9 illustrates a calculation routine for the stored NOx amount NOXst.

Figure 10:
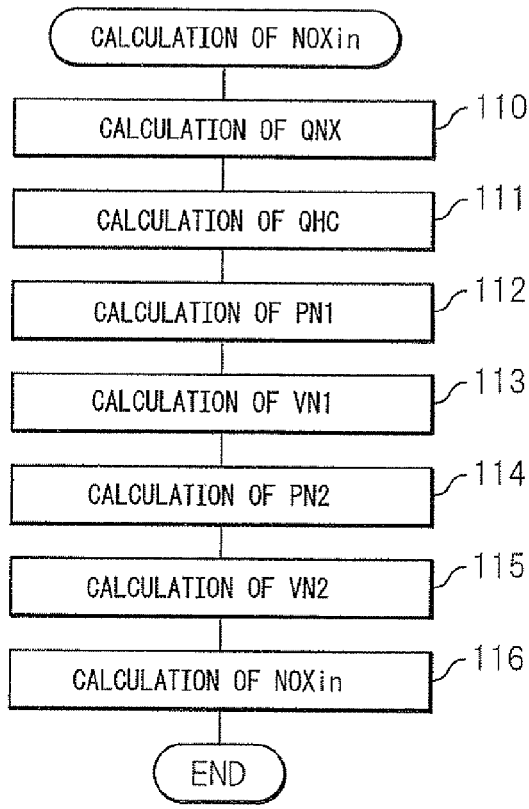
FIG. 10 is a flow chart illustrating a calculation routine for an increment NOXin.

Referring to FIG. 9, in step 100, it is determined whether the air-fuel ratio AFO of the outflow exhaust gas is lower than or equal to the stoichiometric air-fuel ratio AFS or not or, in other words, whether the air-fuel ratio AFO of the outflow exhaust gas is stoichiometric rich or not. When AFO>AFS or in other words, when the air-fuel ratio AFO of the outflow exhaust gas is lean, the process next proceeds to step 101, where a calculation routine of the increment NOXin is performed. This routine is illustrated in FIG. 10. In the next step 102, the decrement NOXrd is assumed to be zero. Next, the process proceeds to step 105.

On the other hand, when AFO≤AFS or, in other words, when the air-fuel ratio AFO of the outflow exhaust gas is stoichiometric or rich, the process next proceeds to step 103, where the increment NOXin is assumed to be zero. In the next step 104, the decrement NOXrd is calculated. Next, the process proceeds to step 105.

In step 105, the stored NOx amount NOXst is updated using the equation E1.

Referring to FIG. 10 that illustrates the calculation routine for the increment NOXin, in step 110, the inflow NOx amount QNX is calculated. In the next step 111, the inflow HC amount QHC is calculated. In the next step 112, the NO ratio PN1 is calculated from the mapping of FIG. 5(B). In the next step 113, the NO storing rate VN1 is calculated from the mapping of FIG. 3(C). In the next step 114, the $NO_2$ ratio PN2 is calculated using the equation E3. In the next step 115, the $NO_2$ storing rate is calculated from the mapping of FIG. 4(C). In the next step 116, the increment NOXin is calculated using the equation E2.

Figure 11:
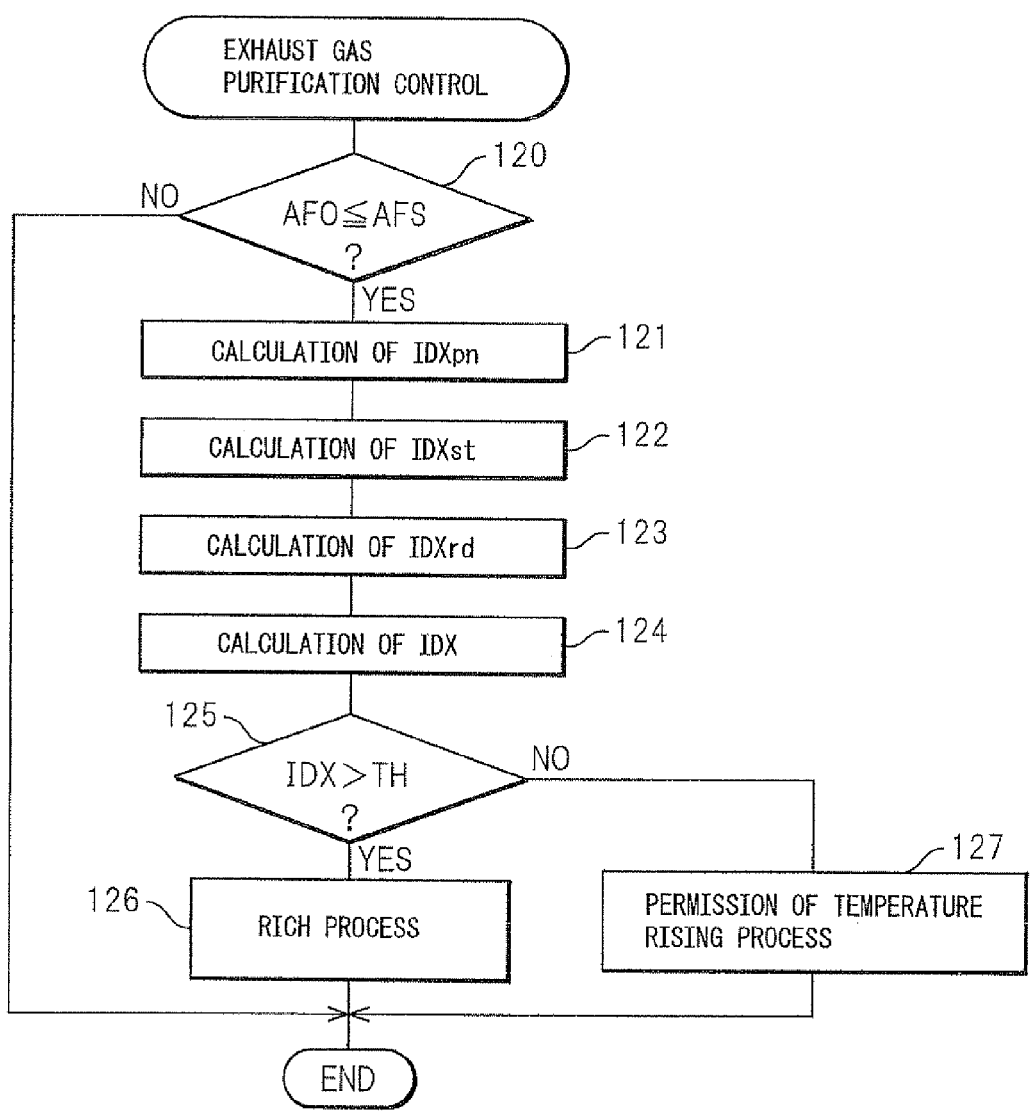
FIG. 11 is a flow chart illustrating an exhaust gas purification control routine.

FIG. 11 illustrates an exhaust gas purification control routine.

Referring to FIG. 11, in step 120, it is determined whether the air-fuel ratio AFO of the outflow exhaust gas is lower than or equal to the stoichiometric air-fuel ratio AFS or not or in other words, whether the air-fuel ratio AFO of the outflow exhaust gas is stoichiometric or rich or not. When AFO≤AFS or, in other words, when the air-fuel ratio AFO of the outflow exhaust gas is stoichiometric or rich, the process cycle is terminated. On the other hand, when AFO>AFS or, in other words, when the air-fuel ratio AFO of the outflow exhaust gas is lean, the process next proceeds to step 121, where the index IDXpn is calculated from the mapping of FIG. 6. In the next step 122, the index IDXst is calculated from the mapping of FIG. 7. In the next step 123, the index IDXrd is calculated from the mapping of FIG. 8. In the next step 124, the rich process requirement index IDX is calculated using the equation E5. In the next step 125, it is determined whether the rich process requirement index IDX is larger than the threshold TH or not. When IDX>TH, the process next proceeds to step 126, where the rich process is performed. On the other hand, when IDX≤TH, the process next proceeds to step 127, where the temperature rising process is permitted. In other words, for example, when the temperature TN of the NOx storing and reducing catalyst 25 is lower than the predetermined temperature, the temperature rising process is executed and the catalyst temperature TN is higher than the predetermined temperature, the temperature rising process is not executed.

Reference Signs List
1 engine body
2 combustion chamber
3 fuel injector
21 exhaust pipe
24 three-way catalyst
25 NOx storing and reducing catalyst

The invention claimed is:

1. An exhaust gas purification device for an internal combustion engine having an exhaust gas passage, comprising:
a NOx storing and reducing catalyst that is disposed in the exhaust gas passage and that stores NOx contained in inflow exhaust gas when an air-fuel ratio of the inflow exhaust gas is lean and releases and reduces the stored NOx when the air-fuel ratio of the inflow exhaust gas becomes rich;
a stored NOx amount calculator for calculating a stored NOx amount of the NOx storing and reducing catalyst; and
a controller for controlling an exhaust gas purification operation based on said calculated stored NOx amount, wherein:
when the air-fuel ratio of the inflow exhaust gas is lean, ratios of NOx components, which are ratios of amounts of NOx components to the total amount of NOx in said inflow exhaust gas, are calculated, and
an increment of the stored NOx amount per unit time is calculated based on said calculated ratios of NOx components.

2. An exhaust gas purification device for an internal combustion engine according to claim 1, wherein said ratios of NOx components are ratios of NO and $NO_2$.

3. An exhaust gas purification device for an internal combustion engine according to claim 1, wherein a pre-stage catalyst having an oxidation function is disposed in the exhaust gas passage upstream of the NOx storing and reducing catalyst, and said ratios of NOx components are calculated based on a temperature of said pre-stage catalyst and a hydrocarbon amount in the exhaust gas flowing into said pre-stage catalyst.

4. An exhaust gas purification device for an internal combustion engine according to claim 1, wherein, when the air-fuel ratio of the inflow exhaust gas is lean, whether to perform a rich process to temporarily make the air-fuel ratio of the inflow exhaust gas rich so as to release and reduce NOx stored in the NOx storing and reducing catalyst or not is determined based on said ratios of NOx components.

5. An exhaust gas purification device for an internal combustion engine according to claim 4, wherein, when it is determined not to execute the rich process, a temperature rising process is executed to increase a temperature of the NOx storing and reducing catalyst while the air-fuel ratio of the inflow exhaust gas is kept lean.

6. An exhaust gas purification device for an internal combustion engine according to claim 4, wherein, when the air-fuel ratio of the inflow exhaust gas is lean, whether to execute the rich process or not is determined based on said ratios of NOx components, said stored NOx amount and a NOx reduction capability of the NOx storing and reducing catalyst.

7. An exhaust gas purification device for an internal combustion engine according to claim 6, wherein said reduction capability of the NOx storing and reducing catalyst is represented by a temperature of the NOx storing and reducing catalyst.

8. An exhaust gas purification device for an internal combustion engine according to claim 1, wherein, when the air-fuel ratio of the inflow exhaust gas is lean, whether to execute the rich process to temporarily make the air-fuel ratio of the inflow exhaust gas rich so as to release and reduce NOx stored in the NOx storing and reducing catalyst or the temperature rising process to increase the temperature of the NOx storing and reducing catalyst while the air-fuel ratio of the inflow exhaust gas is kept lean is selected based on said ratios of NOx components.

* * * * *